US008644212B2

(12) United States Patent
Zhang et al.

(10) Patent No.: US 8,644,212 B2
(45) Date of Patent: Feb. 4, 2014

(54) METHOD AND APPARATUS FOR AUTOMATIC GAIN CONTROL IN A TD-LTE SYSTEM

(75) Inventors: Kai Zhang, Hong Kong (HK); Henry Ye, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 68 days.

(21) Appl. No.: 13/485,855

(22) Filed: May 31, 2012

(65) Prior Publication Data

US 2013/0322269 A1    Dec. 5, 2013

(51) Int. Cl.
*H04B 7/185* (2006.01)

(52) U.S. Cl.
USPC ............................................. 370/318

(58) Field of Classification Search
USPC ............ 370/311, 316, 328, 248, 318; 455/69, 455/522
See application file for complete search history.

(56) References Cited

U.S. PATENT DOCUMENTS 7,787,408 B2 *  8/2010  Proctor et al. ................ 370/315

OTHER PUBLICATIONS

Rumney, M. (2009). LTE and the Evolution to 4G Wireless: Design and Measurement Challenges, Wiley, 2009.
Sesia, S., Toufik, I. and Baker, M. (2009). LTE—The UMTS Long Term Evolution: From Theory to Practice, Wiley, 2009.
The 3rd Generation Partnership Project (2011). "Evolved Universal Terrestrial Radio Access (E-UTRA); Physical channels and modulation," 3GPP TS 36.211, version 10.4.0, Nov. 22, 2011.
The 3rd Generation Partnership Project (2012). "Evolved Universal Terrestrial Radio Access (E-UTRA); Multiplexing and channel coding," 3GPP TS 36.212, version 10.5.0, Mar. 13, 2012.
The 3rd Generation Partnership Project (2012). "Evolved Universal Terrestrial Radio Access (E-UTRA); Physical layer procedures," 3GPP TS 36.213, version 10.5.0, Mar. 13, 2012.

\* cited by examiner

*Primary Examiner* — Chandrahas Patel
(74) *Attorney, Agent, or Firm* — Ella Cheong Hong Kong; Sam T. Yip (57) ABSTRACT

This invention describes method and apparatus for automatic gain control (AGC) for a TD-LTE system, taking into consideration the TD-LTE frame structure. In one embodiment, an AGC method comprises: adjusting RF gain for subframe j (where $0<=j<=9$) in a radio frame according to an average peak signal power of subframe j in previous radio frames when a terminal is lack of information in downlink timing and in uplink/downlink configuration; computing a first average signal power in one or more downlink subframes as received from at least one base station when the terminal has information in downlink timing but is lack of information in uplink/downlink configuration; and computing a second average signal power in one or more downlink subframes as received from at least one base station when the terminal has information in downlink timing and in uplink/downlink configuration.

18 Claims, 8 Drawing Sheets

| Terminal normal start-up procedure ||||
|---|---|---|---|
| State | Action | Conditions | AGC stage |
| DETACHED | Cell search (PSS & SSS) | Lack of information in DL timing & UL/DL configuration | Stage 1 |
| DL Sync. | Receiving system information broadcasting | With DL timing, but lack of information in UL/DL configuration | Stage 2 |
| DL & UL Sync. | Receiving DL data | With DL timing & UL/DL configuration | Stage 3 |

Statistic over sub-frame 0 & 5

FIG. 6B

| Uplink / downlink configuration | Downlink-to-Uplink Switch-point periodicity | Subframe number | | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

METHOD AND APPARATUS FOR AUTOMATIC GAIN CONTROL IN A TD-LTE SYSTEM

TECHNICAL FIELD

The present application relates generally to a method of automatic gain control (AGC) for a Long Term Evolution (LTE) terminal receiver. In particular, it relates to a method of AGC for time-division duplex LTE (TD-LTE, also known as LTE-TDD) terminals.

BACKGROUND

With the exponential growth of wireless communication, new techniques are needed to handle the high capacity of voice and data carried over wireless communication networks. The $3^{rd}$ Generation Partnership Project (3GPP) Long Term Evolution (LTE) (referred to as "LTE" hereinafter) is a promising network proposal to meet the challenge of increased traffic.

For LTE, the orthogonal frequency-division multiplexing (OFDM) modulation scheme is chosen for the transmission of the downlink signals between a transmitter, such as a base station, and a terminal/receiver, such as a user equipment (UE) (e.g., mobile communication devices such as cell phones, etc.). Meanwhile, a special type of modulation method, which is termed single-carrier frequency-division multiple access (SC-FDMA), is used for the transmission of uplink signals.

LTE can be operated in both frequency-division duplex (FDD) and time-division duplex (TDD) modes. In FDD mode, the uplink and downlink signals are transmitted simultaneously, but in separate frequency bands. In TDD mode, the uplink and downlink signals are transmitted in the same frequency band, but in different time slots. Compared to FDD, TDD has the advantage that the downlink-to-uplink ratio can be dynamically adjusted according to the actual amounts of uplink and downlink traffic, and hence enables a more efficient use of the spectrum, especially under asymmetric operations, i.e. when the amounts of uplink and downlink traffic are different. Another advantage is that the uplink and downlink radio paths are likely to be substantially similar in the case of a slow fading system, and it means that techniques such as beamforming work well with TDD systems.

Detailed information on LTE, TDD and FDD can be found in Rumney, LTE and the Evolution of 4G Wireless, John Wiley, © 2009, and Sesia, LTE: The UMTS Long Term Evolution, Wiley © 2009, and the standard documents for E-UTRA: 3GPP TS 36.211: "Evolved Universal Terrestrial Radio Access (E-UTRA); Physical channels and modulation;" 3GPP TS 36.212: "Evolved Universal Terrestrial Radio Access (E-UTRA); Multiplexing and channel coding;" 3GPP TS 36.213: "Evolved Universal Terrestrial Radio Access (E-UTRA); Physical layer procedures" the disclosures of which are incorporated by reference herein.

In most wireless communication systems, the baseband signal at the receiver needs to be converted from an analog format into a digital format so that useful information can be conveniently recovered via a sequence of digital processes. The common device that achieves this conversion is an analog-to-digital converter (ADC). Given the number of output bits of the ADC, if the power of the input signal is too large, the output of the ADC may be saturated or 'clipped'. On the other hand, if the power of the input signal is too small, the input signal may suffer from a significant degradation in the signal-to-noise ratio (SNR) due to the quantization process of the ADC. In both cases, the information to be recovered at the received end may be lost, and a common approach to solve this problem is to apply a dynamically adjustable gain amplifier responsive to the ADC so that the magnitude of the input signal to the ADC is maintained at a desired level. This process of maintaining the input signal magnitude is a closed-loop mechanism, and is known as automatic gain control (AGC).

Due to various reasons, such as variations in the number of active users in a time slot, the mean path loss between the transmitter and receiver, constructive and destructive interferences between multiple transmission paths between the transmitter and receiver (so-called fast-fading) and variations in the data rate, there is a potentially large slot-to-slot variation in the received power. Owing to this power variation, the AGC is required to be able to set the gain of the amplifier preceding the ADC quickly and correctly. Otherwise, the data at the beginning of the time slot may be lost due to either saturation or severe quantization.

There are many existing AGC loop designs, such as the analog-monitored signal AGC loop and the digital-monitored loop, but in general the loops are designed to monitor the received signal at the ADC input, or output, and provide negative feedback to the analog variable receiver gain section in an attempt to maintain the monitored signal at a constant target level. In general, the measured characteristic of the monitored signal is the peak voltage, peak power, or mean power. If the measured characteristic of the monitored signal is higher than the target level, the analog gain of the receiver will be reduced according to the difference between the measured level and the target level; whereas, if the measured characteristic of the monitored signal is lower than the target level, the analog gain of the receiver will be increased accordingly.

However, this known approach has the following drawbacks: 1) In a packet-radio system such as a TDD-CDMA system, for a particular cell frequency, the power of a signal transmitted on a timeslot is, in general, a function of the number of codes transmitted. Thus, given the timeslot-segmented nature of the TDD-CDMA system, the power transmitted in each timeslot may vary considerably as the number of codes varies. The mobile station, although aware of its own timeslot/code allocations, is not usually aware of the allocations to the other users, and therefore cannot predict how much power will be received in a given timeslot. This therefore presents difficulties for AGC since it is the function of AGC to adjust the receiver analog gain in response to the received power such that a signal presented to the ADC is at an appropriate level. 2) For TDD systems, a further problem exists for AGC due to the TDD nature of the system. During the initial synchronization phase, the mobile station must search for a specific synchronization code transmitted by the network. At this point, the mobile station does not have any knowledge of the frame timing of the system. Due to the fact that uplink timeslots are transmitted on the same frequency as downlink timeslots (but are separated in time within the frame), without knowledge of the frame timing, the mobile station must configure itself to receive the signal on all timeslots in search for the synchronization code. The mobile station receiver is therefore subject to reception of uplink signals from nearby mobile stations on the same cell frequency. These uplink signals may be hundreds of times larger in power than the downlink signal that the mobile terminal is trying to detect. As a result, any AGC loop that tries to track the received signal power over the whole radio frame will try to accommodate a substantially large uplink signal and may consequently suppress the (relatively small) wanted downlink synchronization signal, thereby rendering such synchronization signal undetectable. This suppression of the wanted downlink signal is known as "blockage".

Even if the signal is detectable, the synchronization correlation peak in timeslot 0 may be much smaller than the correlation noise peak occurring in the timeslot with highest power. This will result in a synchronization lock failure, or a false detection (which will also eventually lead to a synchronization failure).

Although this problem will not always exist, it is desirable to implement a receiver strategy that provides robustness under these adverse conditions, since an intermittent inability to acquire synchronization will obviously result in a high level of user dissatisfaction. Such conditions are likely to occur in any environment where there is a high possibility of users being in close proximity to each other.

Furthermore, for TD-LTE terminals, there are mainly three challenges in AGC design. First, it is required to provide a high SNR system, for example, 64QAM for high data rate. Consequently, there is a more strict restriction on the ADC quantization noise. Second, TD-LTE has the TDD characteristics that the uplink/downlink (UL/DL) allocation is configurable. Consequently, it is more difficult to estimate received signal power, especially in cases of lack of information in timing and UL/DL configuration. Third, due to the dynamic scheduling at base station, the signal power varies fast in the downlink where the DL signal power is large when much bandwidth is used for transmission while the DL signal power is small when the DL bandwidth is not used for transmission.

Therefore, there remains a need in the art for a quick and accurate method for adjusting the analog signal gain at the input of the ADC in order to maintain the magnitude of the input signal and to prevent any non-detection of the wanted downlink synchronization signal, in particular to a TD-LTE system.

SUMMARY OF THE INVENTION

A first aspect of the present invention is to provide a multiple stage AGC scheme that adapts to different LTE terminal states. On one hand, the present invention allows the received signal to be adjusted to fit the system requirement of the terminal. On the other hand, the present invention allows a more efficient use of power of a terminal so that the power will not be drained out too quickly.

Another aspect of the present invention is to fit the multiple stage AGC scheme with the TD-LTE frame structure and to make the present invention applicable to any TD-LTE system.

For a terminal, it can be at different states and there will be different requirements for the RF gain to the signal received by the terminal. For example, there can be three states for a terminal, namely, a detached state, a DL synchronized state, and a DL/UL synchronized state.

The terminal is at a detached state when there is no timing information at all and the terminal will adjust the RF gain according to an average peak signal power as received using the AGC. The terminal is at a DL synchronized state when there is lack of information on DL/UL configuration and the terminal will adjust the RF gain according to an average signal power as received using the AGC. The terminal is at a DL/UL synchronized state when there is information in DL/UL configuration and the terminal will adjust the RF gain according to an average signal power as received using the AGC.

Other aspects of the present invention are also disclosed as illustrated by the following embodiments.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
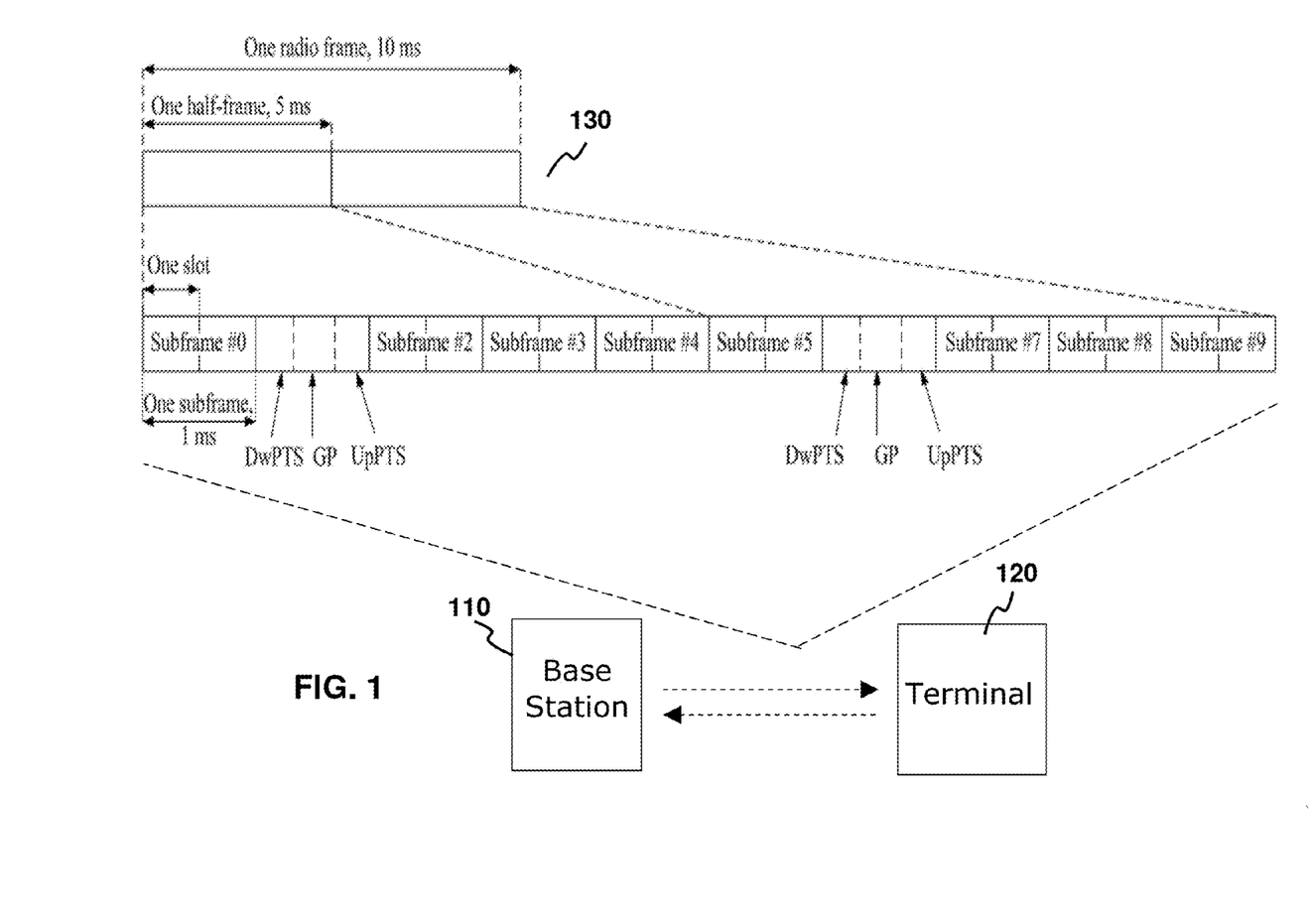
FIG. 1 depicts a block diagram of a communications system in accordance with some embodiments of the present invention.

FIG. 1 depicts a block diagram of a communications system in accordance with some embodiments of the present invention. Signals are communicated between a base station 110 (also known as an e-Node B) and one or more terminals 120 (also known as a user equipment). The signals such as TD-LTE signals are transmitted based on a radio frame 130, for example, with a frame length of 10 ms. One radio frame 130 contains 10 subframes and is used for uplink (UL) or downlink (DL) transmission based on a UL/DL configuration. The UL/DL configuration will be available from the broadcast of the base station 110. In one embodiment, the frame structure of the radio frame 130 is adopted by the present invention.

Figure 2:
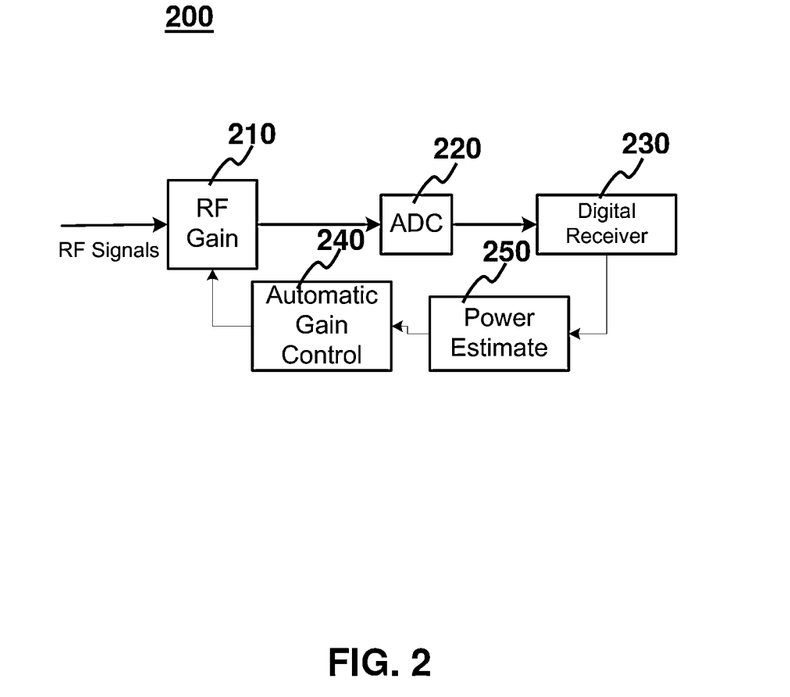
FIG. 2 depicts a block diagram of a terminal which incorporates AGC in accordance with some embodiments of the present invention.

FIG. 2 depicts a block diagram of a terminal which incorporates AGC in accordance with some embodiments of the present invention. A RF signal is received by the receiver 200. Each terminal has at least one receiver 200. The RF signal is amplified by an RF gain 210 before converting from an analog signal into a digital signal by an analog-to-digital converter 220. The digital signal is sent to a digital receiver, and is used by a power estimator 250 to estimate the power of the RF signal. Based on the power estimate, the AGC 240 controls the RF gain 210 for the RF signals.

Figure 3:
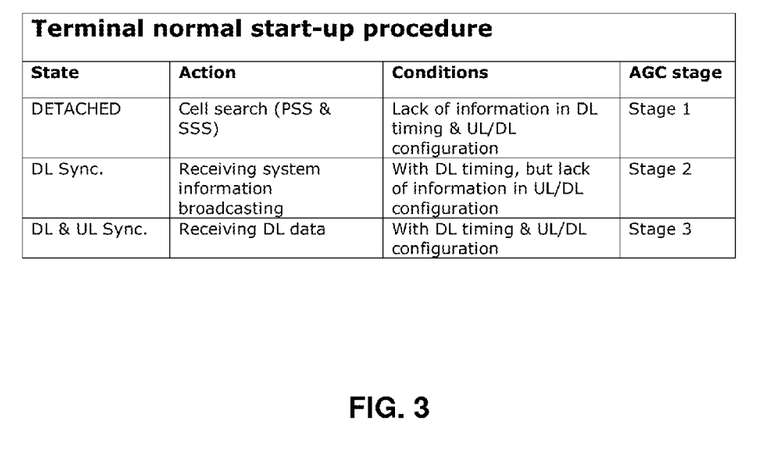
FIG. 3 depicts a table of a normal start-up procedure for a terminal.

FIG. 3 depicts a table of a normal start-up procedure for a terminal. For a normal start-up procedure, a terminal can be classified with the following four states:

(1) Detached State

If there is lack of information in DL timing and UL/DL configuration, a terminal will be in a detached state. In the detached state, the terminal performs a cell search which makes use of the primary synchronized signal (PSS) and the secondary synchronized signal (SSS). In an absence of information in DL timing and in UL/DL configuration, it gives rise to a first stage (Stage 1) for the AGC of the terminal.

(2) Downlink (DL) Synchronized State

If the DL timing is available but there is lack of information in UL/DL configuration, a terminal will be in a DL synchronized state. In the DL synchronized state, the terminal receives system information which is being broadcast. In a presence of information in DL timing but an absence of information in UL/DL configuration, it gives rise to a second stage (Stage 2) for the AGC of the terminal.

(3) Downlink (DL) and Uplink (UL) Synchronized State

If the information in DL timing and UL/DL configuration is available, a terminal will be in a DL/UL synchronized state. In the DL/UL synchronized state, the terminal receives downlink data. In a presence of information in both DL timing and UL/DL configuration, it gives rise to a third stage (Stage 3) for the AGC of the terminal.

The DL synchronized state and the DL/UL synchronized state are also known as the active state.

Figure 4:
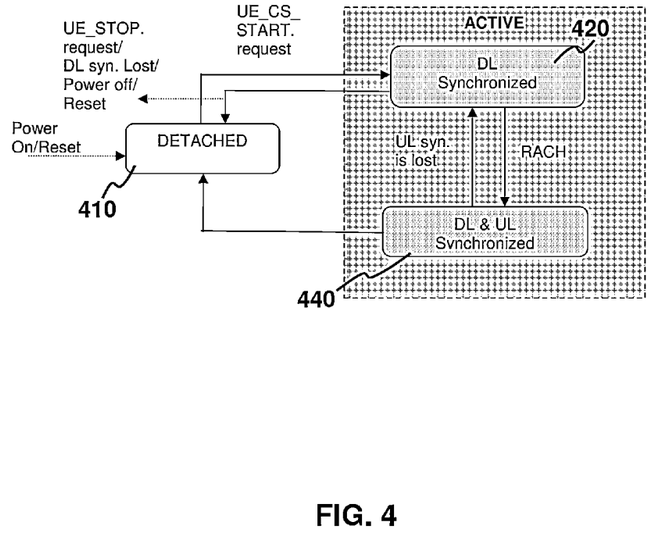
FIG. 4 depicts a flow diagram illustrating a terminal switching between different states.

FIG. 4 depicts a flow diagram illustrating a terminal switching between different states. When a terminal is powered on or reset, the terminal turns into a detached state 410. The terminal starts cell search on receipt of a user equipment cell search start request (UE_CS_START request), and turns into a DL synchronized state 420 from the detached state 410 if DL timing is provided but there is a lack of information in the UL/DL configuration.

The terminal turns into a DL/UL synchronized state 440 from the DL synchronized state 420 when the random access channel (RACH) is established with the information in UL/DL configuration available. When the UL synchronization is lost, the terminal turns into the DL synchronized state 420 from the DL/UL synchronized state 440.

Figure 5:
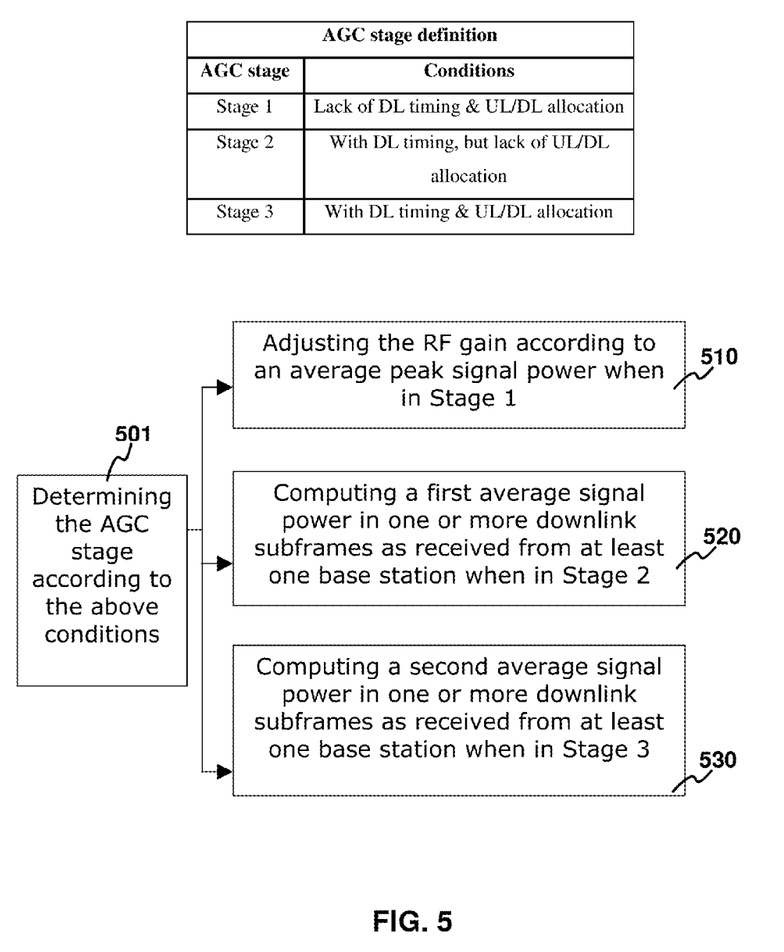
FIG. 5 depicts a flowchart of a multiple stage AGC in accordance with some embodiments of the present invention.

FIG. 5 depicts a flowchart of a multiple stage AGC in accordance with some embodiments of the present invention. The AGC takes different actions according to availability of information in DL timing and in UL/DL configuration. Based on such availability, an AGC stage (Stage 1, Stage 2, or Stage 3) can be determined. In an absence of information in DL timing and in UL/DL configuration, the AGC stage is Stage 1. In a presence of information in DL timing but lacking of information in UL/DL configuration, it is Stage 2. In a presence of information in both downlink timing and UL/DL configuration, it is Stage 3. After determining the AGC stage 501, if Stage 1 is determined, the AGC will adjust a RF gain according to an average peak signal power for every subframe 510. In particular, the terminal computes the averages of the peak power for ten subframes within a radio frame respectively, and then adjusts the RF gain for every subframe separately, such that the RF gain for subframe j (where $0<=j<=9$) in a radio frame is according to an average peak signal power of subframe j in previous radio frames. If Stage 2 is determined, the terminal will compute a first average signal power in one or more downlink subframes as received from at least one base station when the terminal is receiving broadcasting messages by a processor and provide the result to the AGC to adjust the RF gain accordingly 520. For example, the one or more downlink subframes may consist of the downlink subframe number 0 and the downlink subframe number 5. If Stage 3 is determined, the terminal computes an average signal power in one or more downlink subframes as received from at least one base station when the UL/DL configuration is available to the terminal, for example, using the downlink subframe number 0 and the downlink subframe number 5 as well as other subframes that are made known to the terminal in the presence of information in the UL/DL configuration. The AGC will then adjust the RF gain 530 based on the value of the average signal power.

To determine the average peak signal power of the second subframe, the terminal measures peak power levels of a plurality of symbols received in the second subframe, and then performs averaging to yield the average peak power. Preferably, the plurality of symbols received in the second subframe is a collection of first K symbols of the second frame, wherein $5<=K<=7$ for a normal cyclic prefix (CP) mode and $4<=K<=6$ for an extended CP mode.

To determine the average signal power, the terminal averages a total of power levels of one or more symbols received in one or more downlink subframes. Preferably, the symbol which is used for determining the average signal power may be a reference symbol.

The terminal is powered on or reset such that the terminal turns into the detached state, leading to Stage 1 for the AGC of the terminal. The terminal establishes a random access channel with at least one base station such that the terminal turns into the downlink and uplink synchronized state, leading to Stage 3 for the AGC of the terminal. The terminal receives a request to set a discontinuous reception to an active mode by a mode control such that the terminal turns into an active state, leading to Stage 2 or Stage 3 for the AGC of the terminal. The terminal is synchronized with a base station in a downlink such that the terminal turns into a downlink synchronized state, leading to Stage 2 for the AGC of the terminal. The terminal determines that the uplink synchronization is lost such that the terminal switches from the downlink and uplink synchronized state to the downlink synchronized state, leading to Stage 2 for the AGC of the terminal.

FIGS. 6A-6D illustrate how the present invention works at different states of the terminal.

Figure 6A:
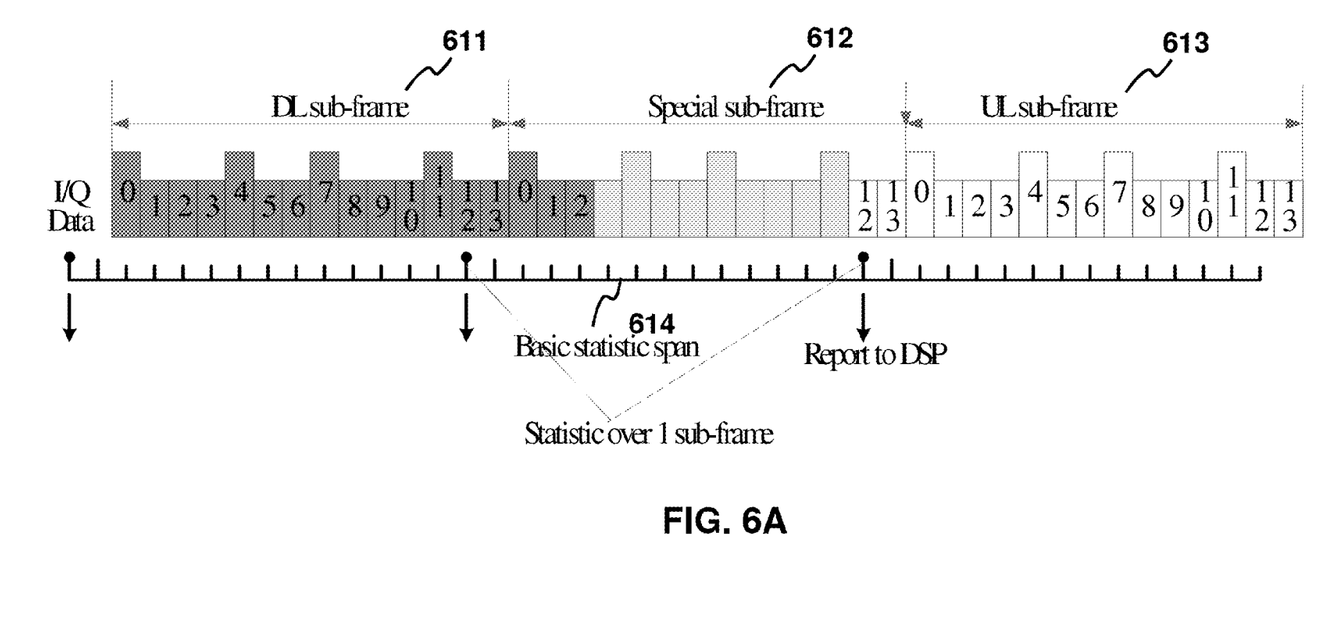
FIGS. 6A-6D illustrate how the present invention works at the detached state, the DL synchronized state, and the DL/UL synchronized state.

FIG. 6A depicts a number of subframes being received by a terminal over a certain period of time. One radio frame contains a number of subframes. For example, for one radio frame with a time interval of 10 ms, there are 10 subframes and each subframe has a time interval of 1 ms. A subframe is also known as a transmission time interval.

Suppose the terminal is at a detached state during which the terminal is performing cell search to acquire downlink timing. From time to time, the AGC of the terminal adjusts the RF gain according to the average peak signal power.

To determine the average peak signal power in a subframe, the terminal carries out statistics on the signal power received in the first K symbols of the subframe where K is as described above. There are different subframe types, for example, a DL subframe 611, a special subframe 612 and an UL subframe 613. The terminal measures the peak power for each contiguous basic statistic span 614 over the time span of a subframe. One subframe contains 14 symbols 614.

After obtaining the statistics over a time span of one subframe, the results are processed by a processor such as a DSP (digital signal processor) to determine the average peak signal power.

Figure 6B:
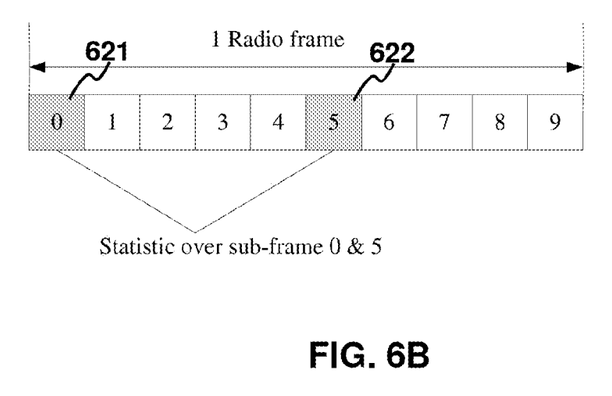

FIG. 6B depicts a DL synchronized state. A terminal gets the DL timing and receives broadcasting messages despite lacking information in the UL/DL configuration. The AGC calculates the average signal power only in DL subframes that are certain to the terminal in an absence of information in UL/DL configuration, for example, subframe number 0 621 and subframe number 5 622. In certain embodiments, only the symbols with reference symbols are used for the calculation of average signal power in one subframe. These reference symbols are those which are always transmitted by a base station regardless of the downlink traffic load, for example, pilot symbols.

Figure 6C:
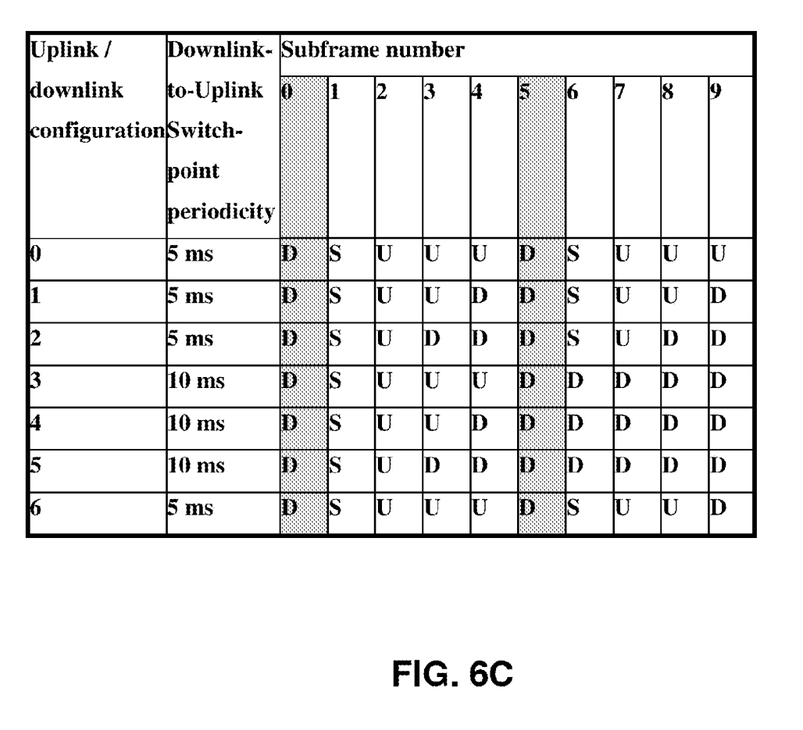

FIG. 6C is a table of non-limiting examples for UL/DL configuration. In a radio frame, the subframe type for each subframe number varies from one UL/DL configuration to another. For subframe number 0 and subframe number 5, the subframe type keeps being the DL subframes. In addition, the terminal has a knowledge of the additional subframes that are DL subframes. The AGC calculates the average signal power based on power levels measured in DL subframes that are known to the terminal. Since the DL subframes need to be located, synchronization with the subframes in the received signal is required.

Figure 6D:
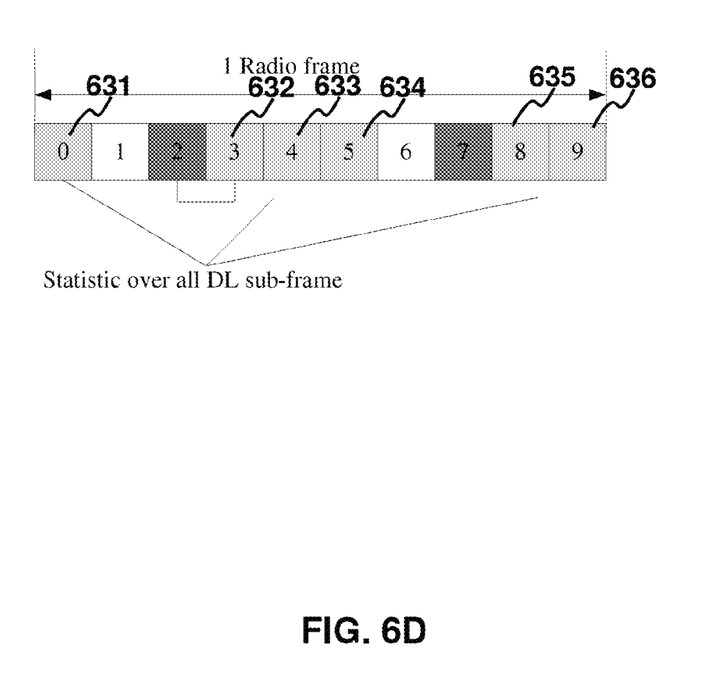

FIG. 6D depicts a DL/UL synchronized state. A terminal receives normal DL signals during the DL/UL synchronized state. The AGC calculates the average signal power based on power levels measured in all DL subframes known to the terminal and within one radio frame, for example, subframe number 0 631, subframe number 3 632, subframe number 4 633, subframe number 5 634, subframe number 8 635 and subframe number 9 636.

Embodiments of the present invention may be implemented in the form of software, hardware, application logic or a combination of software, hardware and application logic. The software, application logic and/or hardware may reside on integrated circuit chips, modules or memories. If desired, part of the software, hardware and/or application logic may reside on integrated circuit chips, part of the software, hardware and/or application logic may reside on modules, and part of the software, hardware and/or application logic may reside on memories. In one exemplary embodiment, the application logic, software or an instruction set is maintained on any one of various conventional non-transitory computer-readable media.

Processes and logic flows which are described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application-specific integrated circuit).

Apparatus or devices which are described in this specification can be implemented by a programmable processor, a computer, a system on a chip, or combinations of them, by operating on input date and generating output. Apparatus or devices can include special purpose logic circuitry, e.g., an FPGA (field programmable gate array) or an ASIC (application-specific integrated circuit). Apparatus or devices can also include, in addition to hardware, code that creates an execution environment for computer program, e.g., code that constitutes processor firmware, a protocol stack, a database management system, an operating system, a cross-platform runtime environment, e.g., a virtual machine, or a combination of one or more of them.

Processors suitable for the execution of a computer program include, for example, both general and special purpose microprocessors, and any one or more processors of any kind of digital computer. Generally, a processor will receive instructions and data from a read-only memory or a random access memory or both. The elements of a computer generally include a processor for performing or executing instructions, and one or more memory devices for storing instructions and data.

Computer-readable medium as described in this specification may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. Computer-readable media may include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

A computer program (also known as, e.g., a program, software, software application, script, or code) can be written in any programming language, including compiled or interpreted languages, declarative or procedural languages, and it can be deployed in any form, including as a stand-alone program or as a module, component, subroutine, object, or other unit suitable for use in a computing environment. A computer program can be deployed to be executed on one computer or on multiple computers that are located at one single site or distributed across multiple sites and interconnected by a communication network.

Embodiments and/or features as described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with one embodiment as described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The whole specification contains many specific implementation details. These specific implementation details are not meant to be construed as limitations on the scope of the invention or of what may be claimed, but rather as descriptions of features specific to particular embodiments of the invention.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims.

Certain functions which are described in this specification may be performed in a different order and/or concurrently with each other. Furthermore, if desired, one or more of the above-described functions may be optional or may be combined.

The above descriptions provide exemplary embodiments of the present invention, but should not be viewed in a limiting sense. Rather, it is possible to make variations and modifications without departing from the scope of the present invention as defined in the appended claims.

What is claimed is:

1. A device for automatically controlling a RF gain for a receiver of a Long Term Evolution (LTE) terminal, comprising:
one or more processors, configured to execute a process comprising:
adjusting the RF gain for subframe j, where $0<=j<=9$, in a radio frame according to an average peak signal power of subframe j in previous radio frames when the terminal is lack of information in downlink timing and in uplink/downlink configuration;
computing a first average signal power in one or more downlink subframes as received from at least one base station and adjusting the RF gain according to the first average signal power, when the terminal has information in downlink timing but is lack of information in uplink/downlink configuration; and
computing a second average signal power in one or more downlink subframes as received from at least one base station and adjusting the RF gain according to the second average signal power, when the terminal has information in downlink timing and in uplink/downlink configuration.

2. The device according to claim 1, wherein the process further comprising:
determining the average peak signal power of the second subframe by measuring a peak power level of each symbol in a plurality of symbols received in the second subframe and then performing averaging.

3. The device according to claim 1, wherein the process further comprising:
determining the first average signal power or the second average signal power by averaging a total of power levels of one or more symbols received in one or more downlink subframes.

4. The device according to claim 3, wherein:
each of the one or more symbols used for determining the first or the second average signal power is a reference symbol.

5. The device according to claim 1, wherein:
the terminal is powered on or reset, causing the terminal to switch to the detached state so that the terminal is lack of information in downlink timing and in uplink/downlink configuration.

6. The device according to claim 1, wherein:
the terminal establishes a random access channel with at least one base station, causing the terminal to switch to the downlink and uplink synchronized state so that the terminal has information in downlink timing and in uplink/downlink configuration.

7. The device according to claim 1, wherein:
the terminal receives a request to set a discontinuous reception to an active mode by a mode control, causing the terminal to switch to an active state so that the terminal either has information in downlink timing and in uplink/downlink configuration, or has information in downlink timing but is lack of information in uplink/downlink configuration.

8. The device according to claim 1, wherein:
the terminal is synchronized with a base station in a downlink, causing the terminal to switch to a downlink synchronized state so that the terminal has information in downlink timing but is lack of information in uplink/downlink configuration.

9. The device according to claim 1, wherein:
the terminal determines that the uplink synchronization is lost, causing the terminal to switch from the downlink and uplink synchronized state to the downlink synchronized state so that the terminal has information in downlink timing but is lack of information in uplink/downlink configuration.

10. An automatic gain control method for adjusting a RF gain for a receiver of a Long Term Evolution (LTE) terminal, comprising:
adjusting the RF gain for a first subframe according to an average peak signal power of a second subframe immediately prior to the first subframe when the terminal is lack of information in downlink timing and in uplink/downlink configuration;
computing a first average signal power in one or more downlink subframes as received from at least one base station and adjusting the RF gain according to the first average signal power, when the terminal has information in downlink timing but is lack of information in uplink/downlink configuration; and
computing a second average signal power in one or more downlink subframes as received from at least one base station and adjusting the RF gain according to the second average signal power, when the terminal has information in downlink timing and in uplink/downlink configuration.

11. The automatic gain control method according to claim 10, further comprising:
determining the average peak signal power of the second subframe by measuring a peak power level of each symbol in a plurality of symbols received in the second subframe and then performing averaging.

12. The automatic gain control method according to claim 10, further comprising:
determining the first average signal power or the second average signal power by averaging a total of power levels of one or more symbols received in one or more downlink subframes.

13. The automatic gain control method according to claim 12, wherein:
each of the one or more symbols used for determining the first or the second average signal power is a reference symbol.

14. The automatic gain control method according to claim 10, wherein:
the terminal is powered on or reset, causing the terminal to switch to the detached state so that the terminal is lack of information in downlink timing and in uplink/downlink configuration.

15. The automatic gain control method according to claim 10, wherein:
the terminal establishes a random access channel with at least one base station, causing the terminal to switch to the downlink and uplink synchronized state so that the terminal has information in downlink timing and in uplink/downlink configuration.

16. The automatic gain control method according to claim 10, wherein:
the terminal receives a request to set a discontinuous reception to an active mode by a mode control, causing the terminal to switch to an active state so that the terminal either has information in downlink timing and in uplink/downlink configuration, or has information in downlink timing but is lack of information in uplink/downlink configuration.

17. The automatic gain control method according to claim 10, wherein:
the terminal is synchronized with a base station in a downlink, causing the terminal to switch to a downlink synchronized state so that the terminal has information in downlink timing but is lack of information in uplink/downlink configuration.

18. The automatic gain control method according to claim 10, wherein:
the terminal determines that the uplink synchronization is lost, causing the terminal to switch from the downlink and uplink synchronized state to the downlink synchronized state so that the terminal has information in downlink timing but is lack of information in uplink/downlink configuration.

* * * * *